US011293531B2

(12) United States Patent
Hagihara

(10) Patent No.: US 11,293,531 B2
(45) Date of Patent: Apr. 5, 2022

(54) AUTOMATIC TRANSMISSION AND CONTROL METHOD OF AUTOMATIC TRANSMISSION

(71) Applicants: JATCO Ltd, Fuji (JP); NISSAN MOTOR CO., LTD., Yokohama (JP)

(72) Inventor: Takanori Hagihara, Fuji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 647 days.

(21) Appl. No.: 16/326,867

(22) PCT Filed: Oct. 2, 2017

(86) PCT No.: PCT/JP2017/035884
§ 371 (c)(1),
(2) Date: Feb. 20, 2019

(87) PCT Pub. No.: WO2018/070294
PCT Pub. Date: Apr. 19, 2018

(65) Prior Publication Data
US 2019/0203813 A1 Jul. 4, 2019

(30) Foreign Application Priority Data

Oct. 11, 2016 (JP) .............................. JP2016-200339

(51) Int. Cl.
*F16H 9/18* (2006.01)
*F16H 1/32* (2006.01)
(Continued)

(52) U.S. Cl.
CPC ................. *F16H 9/18* (2013.01); *F16H 1/32* (2013.01); *F16H 59/70* (2013.01); *F16H 61/02* (2013.01);
(Continued)

(58) Field of Classification Search
CPC ... F16H 9/18; F16H 1/32; F16H 61/32; F16H 61/66272; F16H 63/28; F16H 2001/325; F16H 61/66277
See application file for complete search history.

(56) References Cited

U.S. PATENT DOCUMENTS

| 4,735,598 A | 4/1988 | Moroto et al. |
| 2012/0100944 A1* | 4/2012 | Gu ........................ F16H 63/062 474/46 |

FOREIGN PATENT DOCUMENTS

| JP | S62-13853 A | 1/1987 |
| JP | 2013540245 | 10/2013 |

(Continued)

OTHER PUBLICATIONS

International Search Report re Application No. PCT/JP2017/035884; 2 pages.

*Primary Examiner* — Sherry L Estremsky
(74) *Attorney, Agent, or Firm* — Foley & Lardner LLP

(57) ABSTRACT

An automatic transmission is provided, which includes a variator having a first pulley, a second pulley and a belt wound around the first and second pulleys, a first motor configured to give a pulley thrust force for shifting the variator to the first or second pulley, a second motor configured to cause a belt clamping force to be generated in the variator, and a power transmission mechanism provided between the second motor and the variator, to transmit an output torque of the second motor to the variator. The power transmission mechanism includes a cycloid decelerator configured to decelerate an input torque from the second motor, and transmit the decelerated input torque to the variator.

5 Claims, 5 Drawing Sheets

(51) Int. Cl.
  *F16H 61/662*  (2006.01)
  *F16H 63/28*  (2006.01)
  *F16H 61/32*  (2006.01)
  *F16H 61/02*  (2006.01)
  *F16H 63/50*  (2006.01)
  *F16H 59/70*  (2006.01)

(52) U.S. Cl.
  CPC ........... *F16H 61/32* (2013.01); *F16H 61/662* (2013.01); *F16H 61/66272* (2013.01); *F16H 63/28* (2013.01); *F16H 63/50* (2013.01); *F16H 2001/325* (2013.01)

(56) References Cited

FOREIGN PATENT DOCUMENTS

| | | | | |
|---|---|---|---|---|
| JP | 2015129573 | | 7/2015 | |
| WO | WO-2004057215 | A1 * | 7/2004 | ............... F16H 9/18 |
| WO | WO-2017138396 | A1 * | 8/2017 | ............... F16H 9/18 |
| WO | WO-2018052139 | A1 * | 3/2018 | ............... F16C 19/46 |

\* cited by examiner (a)

(b)

IV — IV

AUTOMATIC TRANSMISSION AND CONTROL METHOD OF AUTOMATIC TRANSMISSION

TECHNICAL FIELD

The present invention relates to an automatic transmission with an electric motor for shifting and an electric motor for belt clamping, and a control method therefor.

BACKGROUND ART

As disclosed in JP62-013853, it is known to generate a force of a pair of pulleys to clamp a belt from both sides (hereinafter, referred to as a "belt clamping force") by a pressure regulating cam mechanism including a fixed race, an operating race and a disc spring in a continuously variable automatic transmission. Unless a torque is applied, a cam cannot generate a thrust force for the pulleys because of characteristics thereof. Thus, by disposing the disc spring, it is enabled to generate a certain pulley thrust force also when no torque is applied, thereby suppressing belt slippage in an initial stage where a sufficient torque cannot be obtained.

SUMMARY OF INVENTION

However, by disposing the disc spring, JP62-013853 has a problem that the belt clamping force becomes excessive on a low reduction ratio side (in other words, on a high gear position side) in response to a thrust force necessary for each pulley ratio, and belt friction is deteriorated.

In contrast, Japanese Patent Application No. 2016-022312 (hereinafter, referred to as "prior application 1") by the present applicant discloses an automatic transmission in which electric motors are respectively provided for shifting and also for belt clamping, and a pulley thrust force necessary for a shifting operation is given by the electric motor for shifting, whereas a belt clamping force is generated by the electric motor for clamping. According to this automatic transmission, the problem of an excessive thrust force due to the disc spring can be solved. However, in prior application 1, how power is supplied to the clamp motor during clamping is not clarified, and an increase of power consumption is unavoidable if power constantly continues to be supplied during clamping.

Accordingly, the present invention has an object to enable a belt clamping force to be properly generated while suppressing an increase of power consumption in an automatic transmission with electric motors respectively for shifting and also for belt clamping.

According to one aspect of the present invention, an automatic transmission is provided, which includes a variator having a first pulley, a second pulley and a belt wound around the first pulley and the second pulley, a first motor configured to give a pulley thrust force for shifting the variator to the first or second pulley, a second motor configured to cause a belt clamping force to be generated in the variator, and a power transmission mechanism provided between the second motor and the variator, to transmit an output torque of the second motor to the variator. In this aspect, the power transmission mechanism includes a cycloid decelerator configured to decelerate an input torque from the second motor, and transmit the decelerated input torque to the variator.

According to one aspect of the present invention, the belt clamping force can be properly generated by disposing the second motor configured to generate the belt clamping force.

Further, since the counter toque transmitted as a reaction force during belt clamping from the variator can be drastically reduced by the cycloid decelerator, the power consumption of the second motor required to ensure the belt clamping force can be reduced.

DESCRIPTION OF EMBODIMENT

Hereinafter, an embodiment of the present invention is described with reference to the drawings.

(Configuration of Vehicle Drive System)

Figure 1:
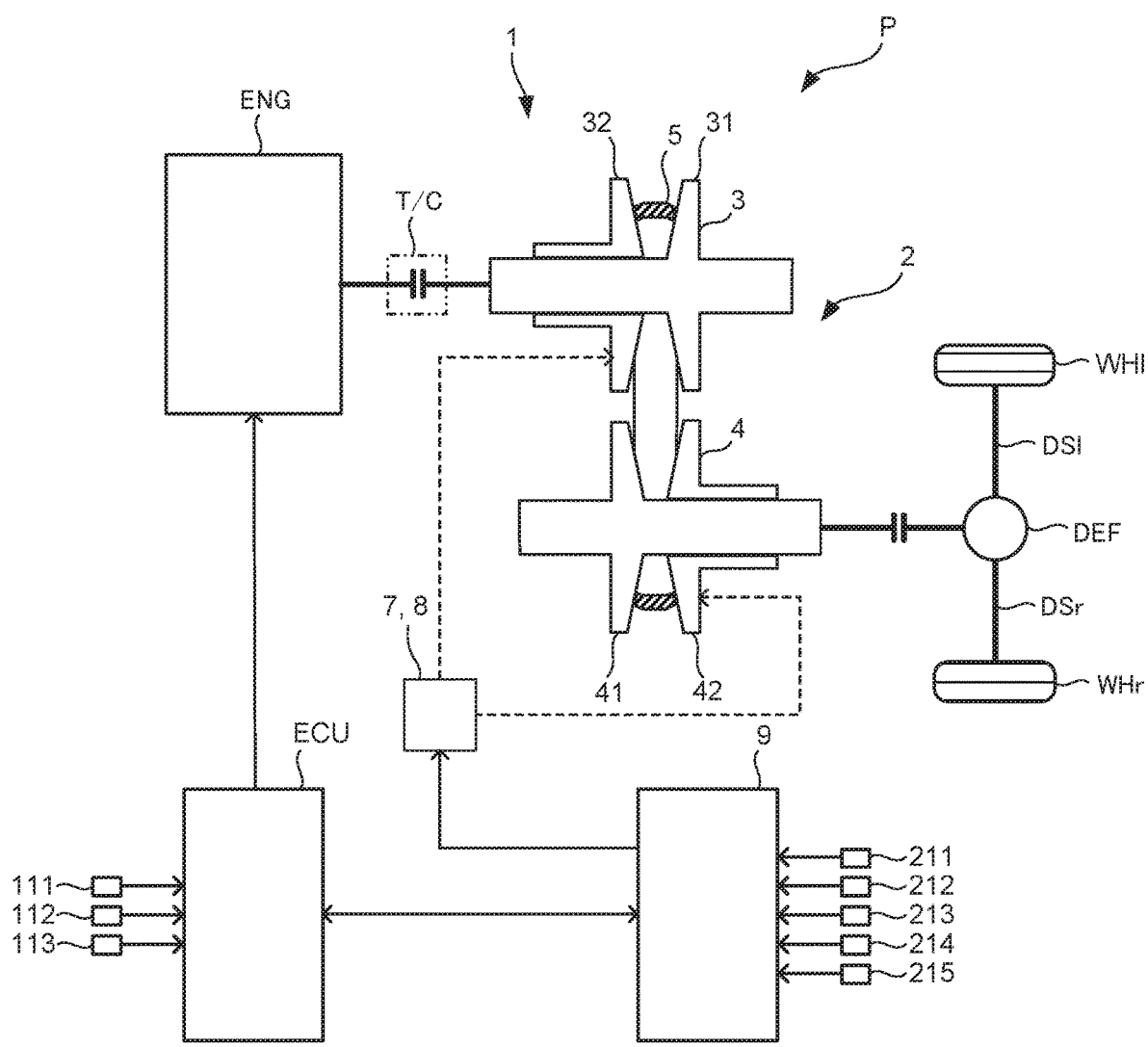
FIG. 1 is a schematic diagram illustrating an overall configuration of a vehicle drive system with an automatic transmission according to one embodiment of the present invention.

FIG. 1 schematically shows an overall configuration of a power transmission system (hereinafter, referred to as a "drive system") P of a vehicle equipped with an automatic transmission 1 according to one embodiment of the present invention.

The drive system P according to the present embodiment includes an internal combustion engine (hereinafter, merely referred to as an "engine") EGN as a drive source, and the automatic transmission 1 is provided on a power transmission path linking the engine ENG and left and right drive wheels WHl, WHr. The engine ENG and the automatic transmission 1 are connected via a torque converter T/C provided with a lock-up clutch. The automatic transmission 1 converts rotational power input from the engine ENG at a predetermined speed ratio, and outputs the converted rotational power to the drive wheels WHl, WHr via a differential gear DEF.

The rotational power output from the automatic transmission 1 is transmitted to drive shafts DSl, DSr via a final gear train or a sub-transmission (both are not shown) set at a predetermined reduction ratio, and the differential gear DEF to rotate the drive wheels WHl, WHr.

(Configuration and Basic Operation of Control System)

The operations of the engine ENG and the automatic transmission 1 are respectively controlled by an engine controller ECU and a transmission controller 9. Both the engine controller ECU and the transmission controller 9 are configured as electronic control units, and each constituted by a microcomputer with a central processing unit (CPU), various storage devices such as a RAM and a ROM, an input/output interface and the like.

The engine controller ECU receives detection signals of operating state sensors for detecting operating states of the engine ENG, performs predetermined calculations on the basis of the operating states, and sets a fuel injection amount, a fuel injection timing, an ignition timing and the like of the engine ENG. Besides an accelerator sensor 111 for detecting an operated amount of an accelerator pedal by a driver, a rotation speed sensor 112 for detecting a rotation speed of the engine ENG, a cooling water temperature sensor 113 for detecting a temperature of engine cooling water and the like, unillustrated air flow meter, throttle sensor, fuel pressure sensor, air-fuel ratio sensor and the like are provided as the operating state sensors.

The transmission controller 9 is communicably connected to the engine controller ECU via a bus of CAN standards or the like. Further, a vehicle speed sensor 211 for detecting a traveling speed of the vehicle, an input-side rotation speed sensor 212 for detecting a rotation speed of an input shaft of the automatic transmission 1, an output-side rotation speed sensor 213 for detecting a rotation speed of an output shaft of the automatic transmission 1, a hydraulic oil temperature sensor 214 for detecting a temperature of hydraulic oil of the automatic transmission 1, a shift position sensor 215 for detecting the position of a shift lever and the like are provided in relation to a control of the automatic transmission 1. The transmission controller 9 receives detection signals of these sensors besides an accelerator opening and the like as the operating states of the engine ENG from the engine controller ECU.

Then, the transmission controller 9 determines a shift range selected by the driver on the basis of a signal from the shift position sensor 215, sets a target speed ratio of the automatic transmission 1 on the basis of the accelerator opening, the vehicle speed and the like, and causes a predetermined pulley thrust force corresponding to the target speed ratio to act on movable pulleys 32, 42 of a primary pulley 3 and a secondary pulley 4 by controlling electric motors 7, 8.

(Overall Configuration of Automatic Transmission)

Figure 2:
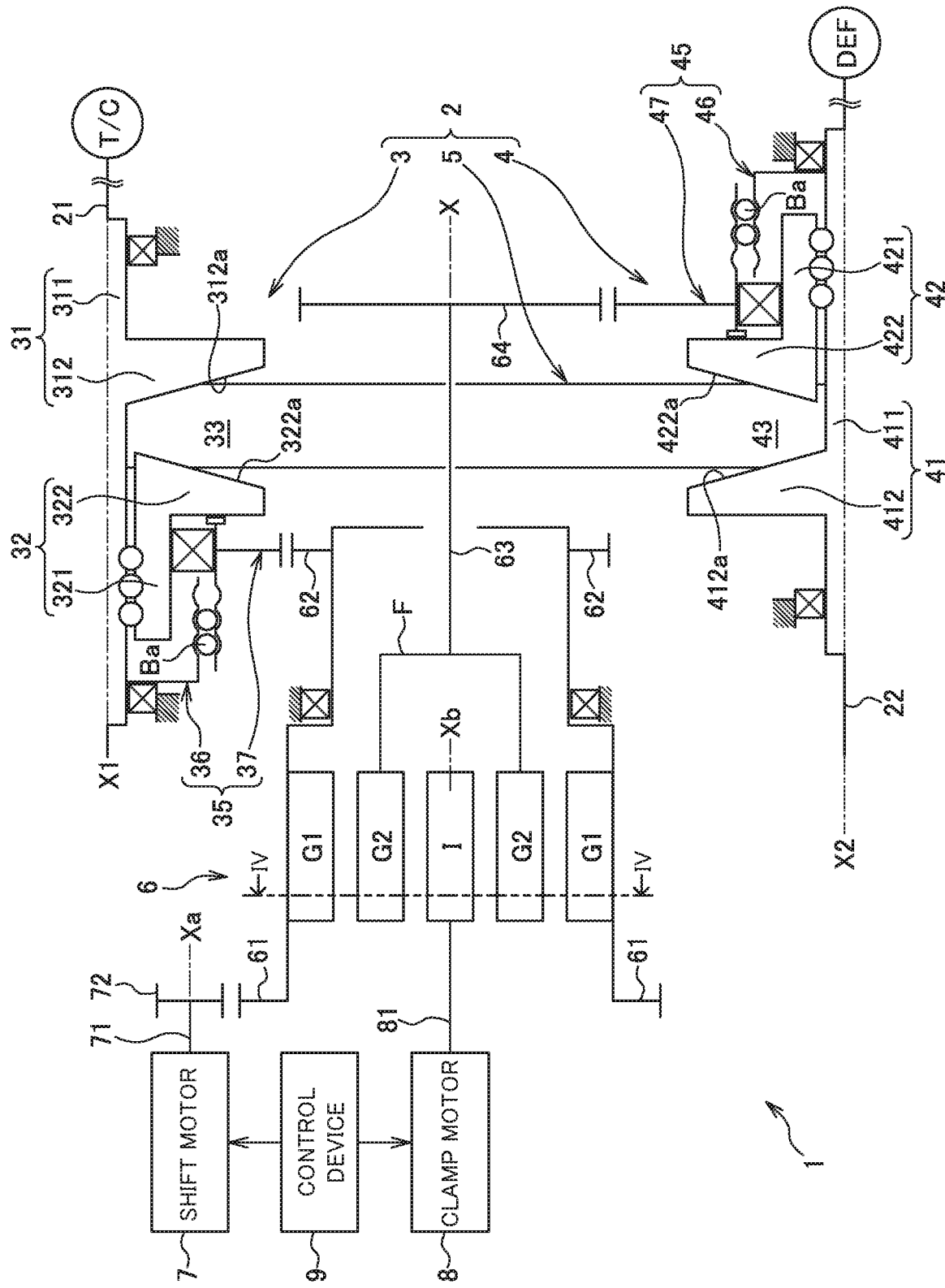
FIG. 2 is a schematic diagram illustrating an overall configuration of the automatic transmission.

FIG. 2 schematically shows an overall configuration of the automatic transmission 1 according to the present embodiment.

FIG. 2 shows only one side of each of the primary pulley 3 and the secondary pulley 4 with respect to an axis of rotation X1, X2 of the pulley.

In the present embodiment, the automatic transmission 1 is a continuously variable automatic transmission, and constitutes a transmission device for vehicle.

The automatic transmission 1 includes a variator 2 composed of the primary pulley 3, the secondary pulley 4 and a belt 5 wound around these pulleys 3, 4. The automatic transmission 1 can continuously adjust a speed ratio by changing winding radii of the belt 5 on the primary pulley 3 and the secondary pulley 4. Here, the speed ratio means a ratio of a rotation speed No of a variator output shaft 22 to a rotation speed Ni of a variator input shaft 21 (=No/Ni). In the present embodiment, a rotation speed ratio between the primary pulley 3 and the secondary pulley 4 is equivalent to the speed ratio. The automatic transmission 1 outputs a torque input from the engine ENG via the torque converter T/C to the output shaft 22 connected to the differential gear DEF after having shifted at a predetermined speed ratio. The primary pulley 3 constitutes a "first pulley" and the secondary pulley 4 constitutes a "second pulley". The belt 5 may be a steel belt formed by tying a plurality of elements arranged in a plate thickness direction with a hoop or a band or, without being limited to this, may be a chain belt.

The primary pulley 3 is composed of a fixed pulley 31 and the movable pulley 32 provided displaceably in a direction of the axis of rotation X1 of the primary pulley 3 with respect to the fixed pulley 31, and the movable pulley 32 is so mounted that relative rotation about the axis of rotation X1 with respect to the fixed pulley 31 is restricted. The fixed pulley 31 and the movable pulley 32 have sheave surfaces 312a, 322a facing each other, and a V-groove 33 in which the belt 5 is wound on the primary pulley 3 is formed by these sheave surfaces 312a, 322a.

Similarly to the primary pulley 3, the secondary pulley 4 is composed of a fixed pulley 41 and the movable pulley 42, and the movable pulley 42 is provided displaceably in a direction of the axis of rotation X2 of the secondary pulley 4 with respect to the fixed pulley 41, and so mounted that relative rotation about the axis of rotation X2 with respect to the fixed pulley 41 is restricted. A V-groove 43 in which the belt 5 is wound on the secondary pulley 4 is formed by sheave surfaces 412a, 422a of the fixed pulley 41 and the movable pulley 42 facing each other.

In the present embodiment, the axis of rotation X1, X2 of the pulley is formed by a rotary shaft of the fixed pulley 31, 41 in each of the primary pulley 3 and the secondary pulley 4.

Each of the primary pulley 3 and the secondary pulley 4 is provided with a screw feed mechanism 35, 45, and configured such that an output torque of the electric motor 7 provided for shifting (equivalent to a first motor; hereinafter, referred to as a "shift motor") is transmitted to the movable pulley 32, 42 via the screw feed mechanism 35, 45 to generate a pulley thrust force for pressing the movable pulley 32, 42 in a direction of narrowing a groove width of the V-groove 33, 43. Further, each of the primary pulley 3 and the secondary pulley 4 is configured such that an output torque of the electric motor 8 provided for belt clamping (equivalent to a second motor; hereinafter, referred to as a "clamp motor") is transmitted to the movable pulley 32, 42 via the screw feed mechanism 35, 45 to generate a belt clamping force for clamping the belt 5 by the movable pulley 32, 42 and the fixed pulley 31, 41.

In the present embodiment, an electric motor having a large number of revolutions is employed as the shift motor 7, and an electric motor having a large maximum output torque is employed as the clamp motor 8. The operations of the shift motor 7 and the clamp motor 8 are controlled by a control device 9. The control device 9 is configured as an electronic control unit, and includes a microcomputer, storage devices such as a ROM and a RAM, and an input/output interface, which are built in the control device 9. In the present embodiment, the control device 9 is embodied by the transmission controller 9.

(Configuration of Screw Feed Mechanism)

Figure 3:
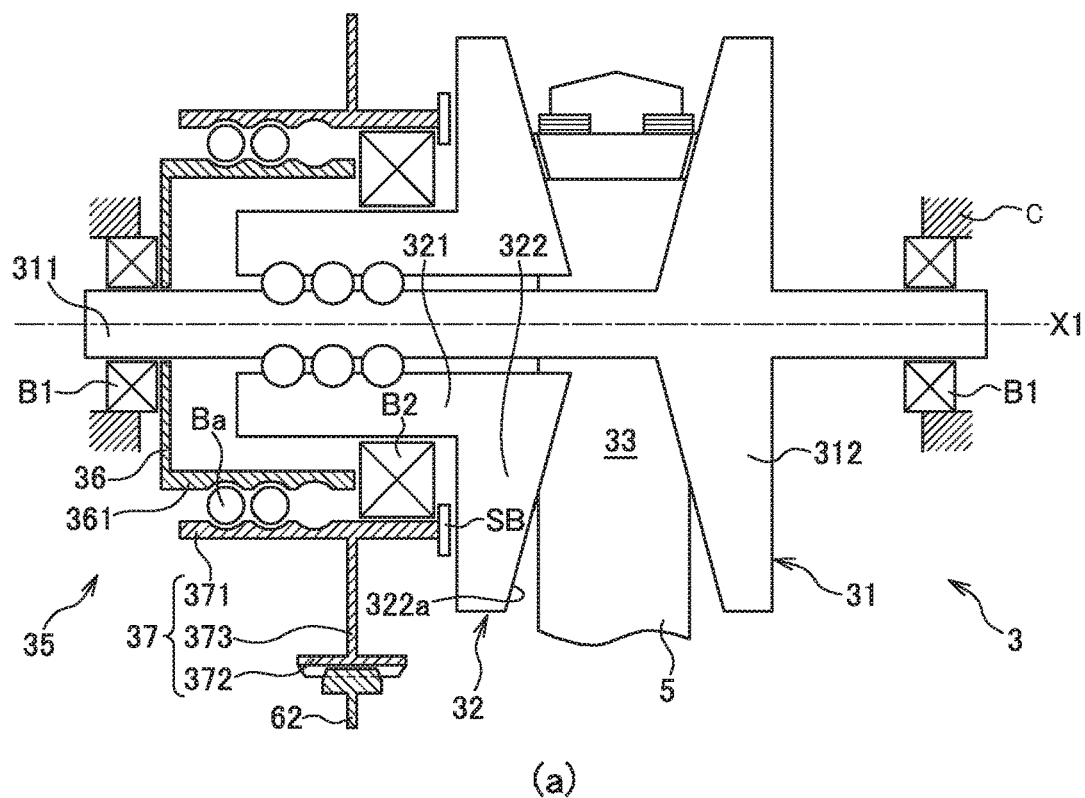
FIG. 3 is a configuration diagram of a screw feed mechanism provided in the automatic transmission.
Figure 3:
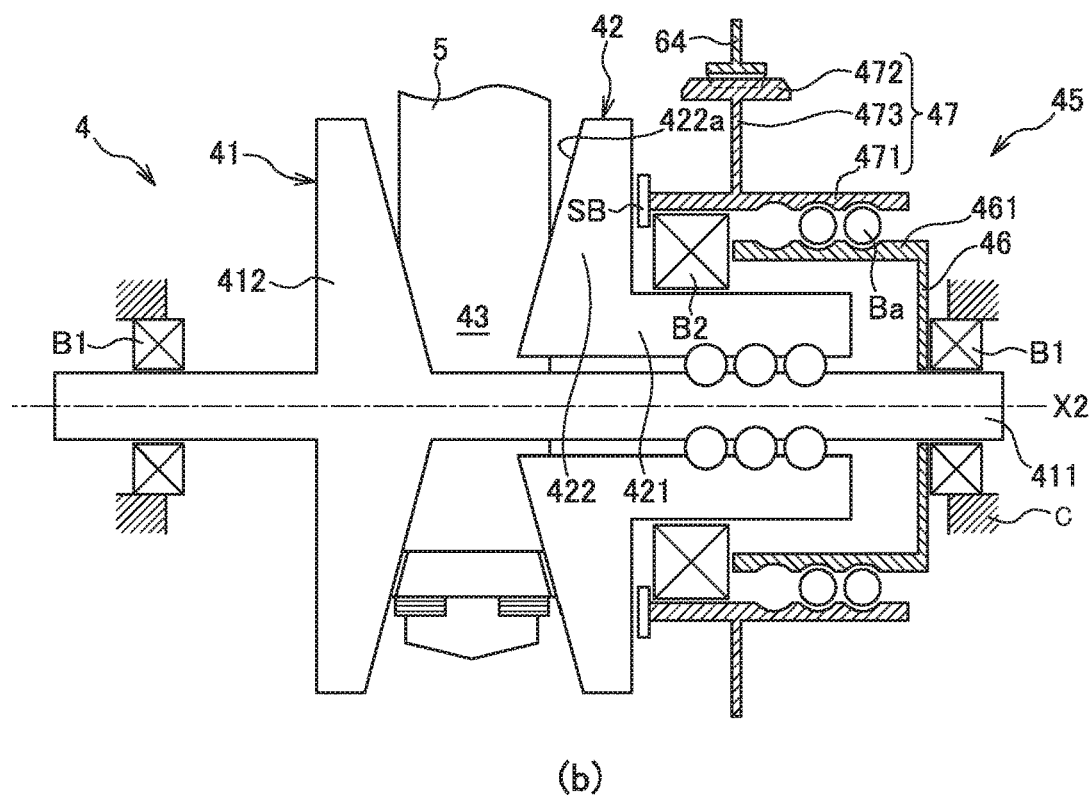

FIG. 3 show the configurations of the screw feed mechanisms 35, 45 provided in the automatic transmission 1. FIG. 3(a) shows the screw feed mechanism 35 on the side of the primary pulley 3, and FIG. 3(b) shows the screw feed mechanism 45 on the side of the secondary pulley 4.

Describing the screw feed mechanism 35 on the side of the primary pulley 3 as a representative, the screw feed mechanism 35 includes a fixed member 36 externally fitted to a rotary shaft 311 of the fixed pulley 31, and a movable member 37 externally fitted on the fixed member 36 (specifically, a tubular portion 361 of the fixed member 36).

The movable member 37 is held in contact with a sheave portion 322 of the movable pulley 32 via a thrust bearing SB while being supported on the rotary shaft 321 of the movable pulley 32 by a radial bearing B2.

The fixed member 36 is in such a state where movement thereof in an axial direction is restricted by a radial bearing B1 rotatably supporting the rotary shaft 311 of the fixed pulley 31 in a pulley case C, and relative rotation thereof with respect to the pulley case C is also restricted. The relative rotation of the fixed member 36 can be restricted by directly meshing the fixed member 36 and the pulley case C, such as by projections and recesses or by engaging the fixed member 36 and the pulley case C with each other via a rotation restricting member. In the present embodiment, the fixed member 36 constitutes a shaft portion of a ball screw feed mechanism, and a plurality of balls Ba are held between the fixed member 36 and the movable member 37 (specifically, a pressing portion 371 of the movable member 37). Since the rotation of the fixed member 36 with respect to the pulley case C is restricted, the fixed member 36 gives a linear displacement along the axis of rotation X1 of the primary pulley 3 to the movable member 37 when the movable member 37 is rotationally driven.

The movable member 37 includes the pressing portion 371 in the form of a hollow cylinder to be brought into contact with the sheave portion 322 of the movable pulley 32, an outer tube portion 372 having a larger outer diameter than the pressing portion 371, and a connecting portion 373 in the form of a disc linking the pressing portion 371 and the outer tube portion 372, and further a plurality of gear teeth are formed on the outer periphery of the outer tube portion 372. An output torque of the electric motor 7, 8 is input via the gear teeth of the outer tube portion 372, whereby a linear displacement based on rotation is given to the movable member 37 through the ball screw feed mechanism, and the movable member 37 is pressed against the sheave portion 322 of the movable pulley 32 via the thrust bearing SB.

Here, upon changing the speed ratio of the variator 2, if in the screw feed mechanism 35 on the side of the primary pulley 3, the movable member 37 is displaced in a direction of pressing the movable pulley 32 (in other words, in a direction of narrowing the groove width of the V-groove 33) by a torque input via the outer tube portion 372, in the screw feed mechanism 45 on the side of the secondary pulley 4, a movable member 47 is displaced in a direction of allowing the movable pulley 42 to be separated from the fixed pulley 41 (in other words, in a direction of widening the groove width of the V-groove 43) by a torque input via an outer tube portion 472.

Contrary to this, upon changing the speed ratio of the variator 2, if in the screw feed mechanism 35 on the side of the primary pulley 3, the movable member 37 is displaced in a direction of allowing the movable pulley 32 to be separated from the fixed pulley 31 (in other words, in a direction of widening the groove width of the V-groove 33) by a torque input via the outer tube portion 372, in the screw feed mechanism 45 on the side of the secondary pulley 4, the movable member 47 is displaced in a direction of pressing the movable pulley 42 (in other words, in a direction of narrowing the groove width of the V-groove 43) by a torque input via the outer tube portion 472.

Referring back to FIG. 2, in the present embodiment, a cycloid decelerator 6 is interposed between the shift and clamp motors 7, 8 and the screw feed mechanisms 35, 45.

The cycloid decelerator 6 basically has a function similar to that of a pinion gear type planetary gear mechanism provided in automatic transmissions in general, and transmits an output torque of at least one of the shift motor 7 and the clamp motor 8 to the movable pulleys 32, 42 via the screw feed mechanisms 35, 45. The cycloid decelerator 6 may be configured similarly to a generally known cycloid decelerator, and is roughly composed of an input shaft I (corresponding to a sun gear in the planetary gear mechanism), an internal tooth gear G1 (likewise corresponding to a ring gear), an external tooth gear G2 (likewise corresponding to a pinion gear), and an output shaft 63 coupled to the external tooth gear G2 via unillustrated inner pins. A motor pinion 72 fixed to an output shaft 71 of the shift motor 7 is engaged with an external tooth portion 61 formed on the outer periphery of the internal tooth gear G1, and an output torque of the shift motor 7 is transmitted to the internal tooth gear G1 via the motor pinion 72 and the external tooth portion 61. On the other hand, the input shaft I is directly coupled to an output shaft 81 of the clamp motor 8, and an output torque of the clamp motor 8 is transmitted to the input shaft I via the output shaft 81.

Figure 4:
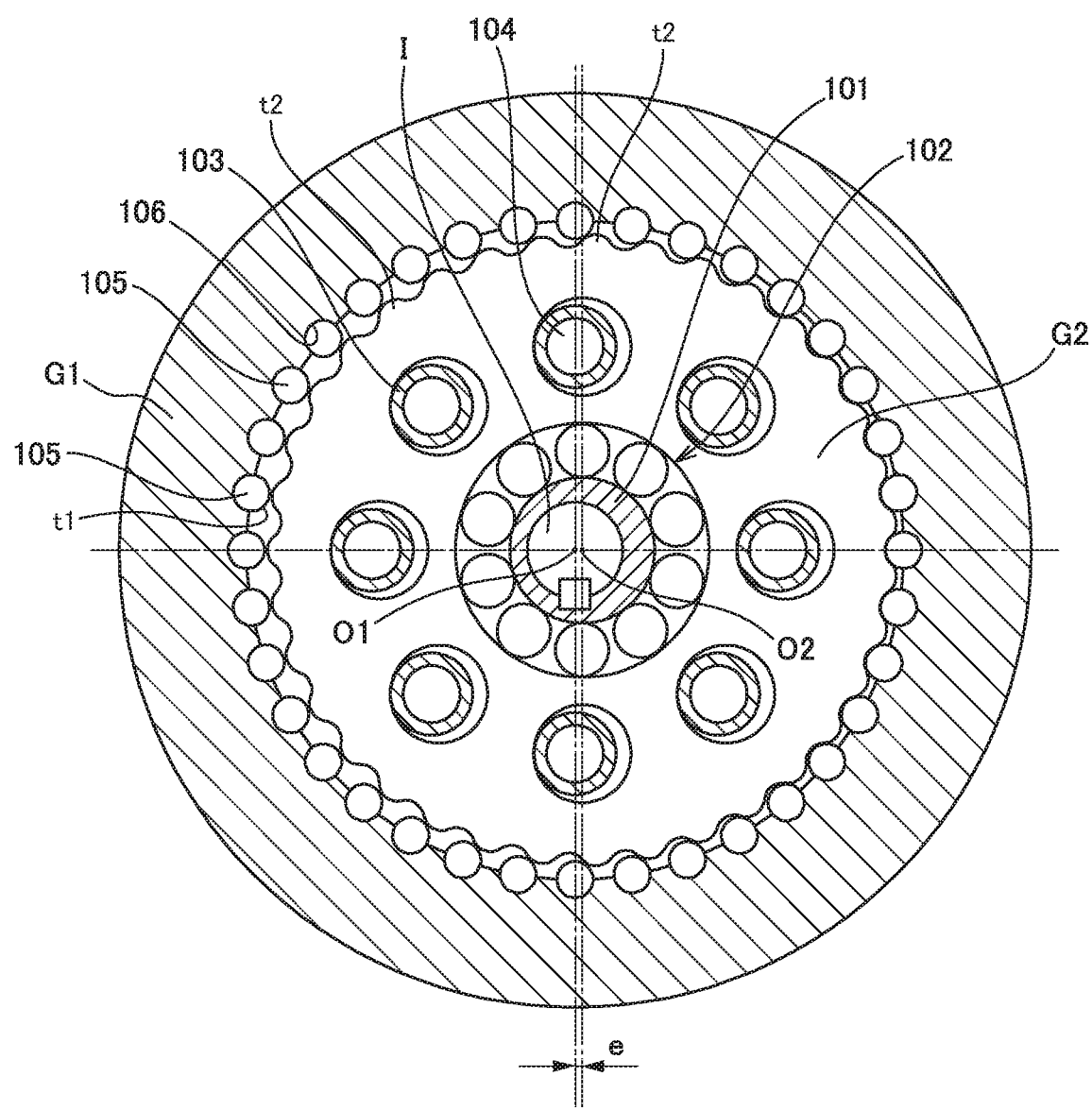
FIG. 4 is a configuration diagram of a cycloid decelerator provided in a power transmission mechanism of the automatic transmission.

FIG. 4 shows the configuration of the cycloid decelerator 6 by a cross-section along line IV-IV illustrated in FIG. 2.

The cycloid decelerator 6 is further described using FIG. 4 also with reference to FIG. 2.

The cycloid decelerator 6 decelerates a torque input through the input shaft I at a predetermined reduction ratio, and outputs the decelerated torque from the output shaft 63. The external tooth gear G2 rotates while relatively making an eccentric rocking motion with respect to the internal tooth gear G1, thereby extracting a rotational component of the external tooth gear G2 as an output of the decelerator 6. By fixing the external tooth gear G2, the rotational component can also be output via the internal tooth gear G1.

The cycloid decelerator 6 includes the input shaft I, an eccentric body 101 fitted to the input shaft I and configured to rotate integrally with the input shaft I, the annular external tooth gear G2 mounted on the eccentric body 101 via a radial bearing 102 and having a plurality of external teeth formed on an outer periphery, the internal tooth gear G1 having a plurality of internal teeth formed on an inner periphery, to be meshed with the external teeth of the external tooth gear G2, and the output shaft 63 having members 103 configured to extract the rotational component of the external tooth gear G2 and connected to the external tooth gear G2 via these members 103. The input shaft I and the internal tooth gear G1 are in a state where they are rotatable relative to each other about a common axis Xb.

The eccentric body 101 is mounted on the input shaft I while being made eccentric with respect to a center O1 of the input shaft I by a predetermined eccentric amount e (a center of the eccentric body 101 is indicated by O2).

The external tooth gear G2 is formed with a plurality of inner roller holes 104 at intervals (at equal intervals in the present embodiment) in a circumferential direction, and the inner pin 103, which is the above "member configured to extract the rotational component of the external tooth gear", is loosely fitted into each of the inner roller holes 104. The output shaft 63 is formed with a flange portion F, and the inner pins 103 are loosely fitted into the inner roller holes 104 of the external tooth gear G2 and fixed or joined to the flange portion F, whereby the external tooth gear G2 and the output shaft 63 are connected via the inner pins 103.

Further, the external tooth gear G2 is formed with external teeth t2 having a trochoidal tooth profile (specifically, an epitrochoidal parallel curve tooth profile) on the outer periphery thereof. The external tooth gear G2 is inscribed and engaged with the internal tooth gear G1 via these external teeth t2.

A plurality of outer pins 105 are mounted on the inner periphery of the internal tooth gear G1. Specifically, a plurality of pin grooves 106 are formed over the entire circumference on the inner periphery of the internal tooth gear G1, and the outer pin 105 is fitted into each of the pin grooves 106. Tooth surfaces of internal teeth t1 are formed by parts of the outer pins 105 exposed on an inner radial side.

When the input shaft I rotates, the eccentric body 101 rotates integrally with the input shaft I, and a force is transmitted to the external tooth gear G2. Here, the eccentric body 101 makes one turn every time the input shaft I makes one turn. According to the rotation of the eccentric body 101, the external tooth gear G2 is also urged to rotate about the input shaft I, but is in a state where the rotation is limited by constraint due to meshing with the internal tooth gear G1. Thus, the external tooth gear G2 simultaneously makes an eccentric rocking motion based on the input shaft I, and a slight rotational motion centered on the input shaft I. Here, a rotation speed of the external tooth gear G2 corresponds to a difference between the number of teeth of the external tooth gear G2 and that of the internal tooth gear G1, and a rotating direction of the external tooth gear G2 is opposite to that of the input shaft I.

For example, if n denotes the number of teeth of the external tooth gear G2 and n+1 denotes the number of teeth of the internal tooth gear G1, a tooth number difference Dn between these numbers is 1. Thus, the internal tooth gear G1 is deviated in the rotating direction by one tooth with respect to the external tooth gear G2 while the input shaft I is making one turn. This is transmitted as the rotational component of the external tooth gear G2 to the output shaft 63 via the inner pins 103. This means that the rotation of the input shaft I is transmitted to the external tooth gear G2 while being decelerated by 1/n, and that a reduction ratio between the input shaft I and the output shaft 63 is n. In the present embodiment, by setting the number n of teeth of the external tooth gear G2 at 60, the reduction ratio of the cycloid decelerator 6 is set at 60. This is a reduction ratio drastically larger than the one set for a general planetary gear mechanism.

The rotation of the external tooth gear G2 has a rocking component absorbed by clearances between the inner pins 103 and the inner roller holes 104, and only the rotational component thereof is transmitted to the output shaft 63 via the inner pins 103, whereby shifting at the reduction ratio n is performed. The reduction ratio n is not limited to 60, but can be appropriately set.

In the present embodiment, an output gear portion 64 on the side of the secondary pulley 4 is joined to the tip of the output shaft 63 of the cycloid decelerator 6. The outer gear portion 64 is engaged with a gear portion (outer tube portion 472) provided on the movable member 47 of the screw feed mechanism 45 on the side of the secondary pulley 4. When the external tooth gear G2 rotates, an output torque of the cycloid decelerator 6 is input to the screw feed mechanism 45 via the output shaft 63 and the outer gear portion 64.

Further, the internal tooth gear G1 is provided with a tubular and annular outer gear portion 62 extending parallel to the output shaft 63, and this outer gear portion 62 on the side of the primary pulley 3 is engaged with a gear portion (outer tube portion 372) provided on the movable member 37 of the screw feed mechanism 35 on the side of the primary pulley 3. When the internal tooth gear G1 rotates, an output torque of the cycloid decelerator 6 is input to the screw feed mechanism 35 via the outer gear portion 62.

The cycloid decelerator 6 adjusts a torque for changing the speed ratio of the variator 2 and also for fixing the speed ratio on the basis of an output torque of the shift motor 7 and that of the clamp motor 8.

Specifically, in the case of changing the speed ratio of the variator 2, the output torque of the shift motor 7 is input to the screw feed mechanisms 35, 45 via the cycloid decelerator 6, and converted into a force (pulley thrust force) for driving the movable members 37, 47 along the axes of rotation X1, X2. For example, the movable pulley 32 is pressed by the movable member 37 of the screw feed mechanism 35, whereby the groove width of the V-groove 33 is reduced on the side of the primary pulley 3. On the other hand, a displacement of the movable pulley 42 in a direction for separating from the fixed pulley 41 is allowed by the movable member 47 of the screw feed mechanism 45, whereby the groove width of the V-groove 43 is widened on the side of the secondary pulley 4.

Figure 5:
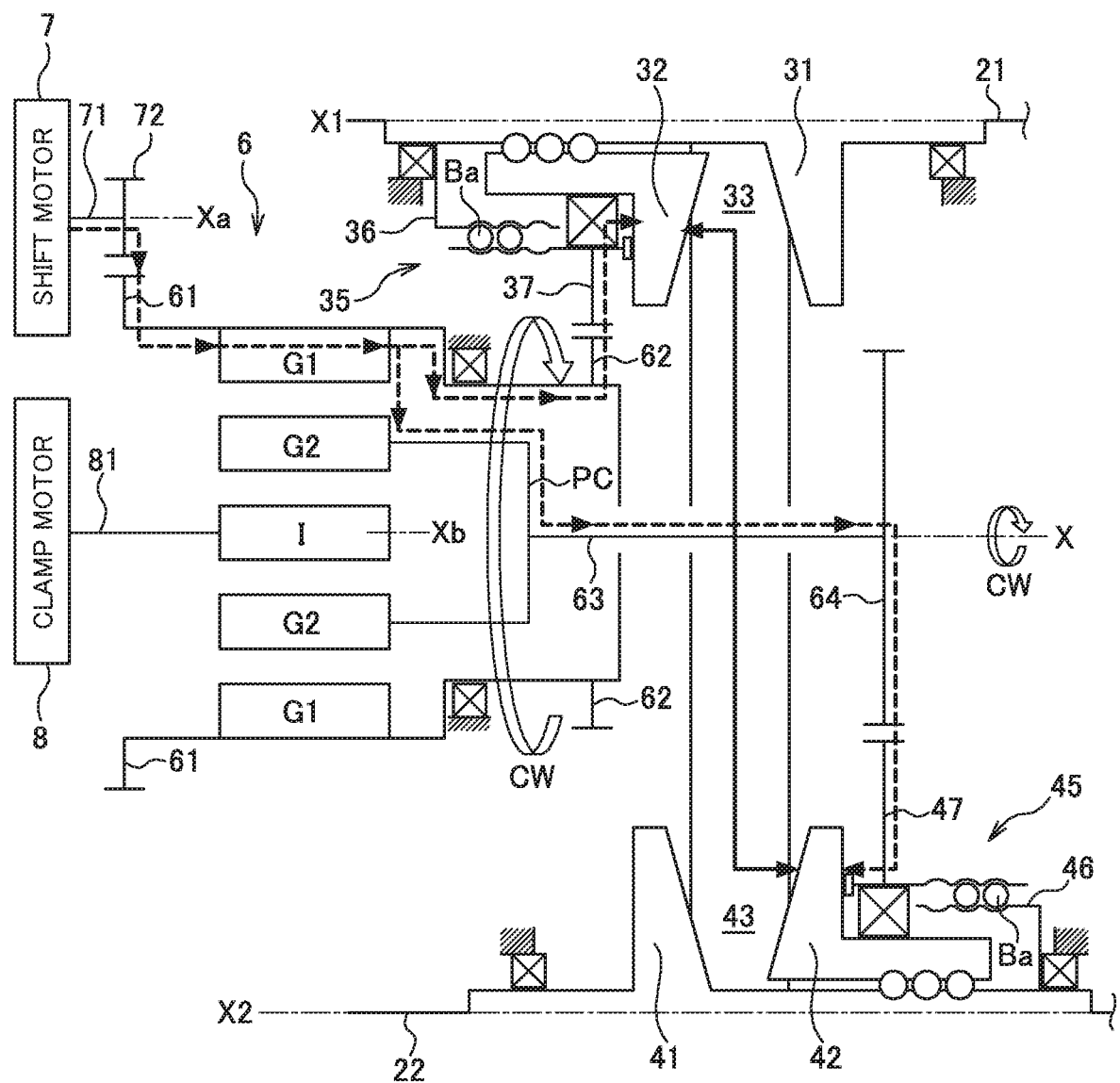
FIG. 5 is an explanatory diagram illustrating an operation at the time of shifting the automatic transmission.

FIG. 5 shows an operation at the time of shifting the automatic transmission 1 according to the present embodiment.

During shifting, the clamp motor 8 is driven to generate a holding torque, thereby fixing the input shaft I, and a pulley thrust force is generated by the shift motor 7 for changing the speed ratio. By changing the output torque of the shift motor 7, and causing a difference between the pulley thrust forces acting on the primary pulley 3 and the secondary pulley 4 (hereinafter, referred to as a "thrust force difference"), a desired speed ratio is achieved.

The output torque of the shift motor 7 is input to the internal tooth gear G1 via the motor pinion 72 and the external tooth portion 61 of the internal tooth gear G1, and the internal tooth gear G1 rotates about a center axis X of the cycloid decelerator 6. When the internal tooth gear G1 rotates, the external tooth gear G2 rotates about the eccentric body 101, following the rotation of the internal tooth gear G1. In this way, the outer gear portion 62 joined to the internal tooth gear G1 and the outer gear portion 64 joined to the external tooth gear G2 via the output shaft 63 rotate in the same direction CW about the center axis X, and the output torque of the shift motor 7 is input to the movable members 37, 47 of the screw feed mechanisms 35, 45.

The rotations of the outer gear portions 62, 64 are converted into linear displacements of the movable members 37, 47 by the screw feed mechanisms 35, 45, and the movable members 37, 47 move along the axes of rotation X1, X2. For example, if the movable member 37 moves in a direction toward the movable pulley 32 and presses the sheave portion 322 of the movable pulley 32 to narrow the groove width of the V-groove 33 in the screw feed mechanism 35 on the side of the primary pulley 3, the movable member 47 is separated from the sheave portion 422 of the movable pulley 42 and a displacement of the movable pulley 42 in the direction for separating from the fixed pulley 41 is allowed in the screw feed mechanism 45 on the side of the secondary pulley 4. In this way, the groove width of the V-groove 33 in the primary pulley 3 is narrowed to expand the winding radius of the belt 5, whereas the groove width of the V-groove 43 in the secondary pulley 4 is widened to reduce the winding radius of the belt 5, whereby shifting is performed.

In contrast, in the case of maintaining the speed ratio (in other words, the pulley thrust force is constant), the supply of power to the clamp motor 8 is stopped and a friction torque in the clamp motor 8 is increased by the cycloid decelerator 6, whereby maintaining the belt clamping force. In other words, by the cycloid decelerator 6, a counter torque acting on the input shaft I from the variator 2 on the basis of a reaction force during belt clamping is made smaller than the friction torque in the clamp motor 8.

As an example, if a thrust force (pulley thrust force) N for the movable pulley 32 or 42 is 50 kN, a conversion efficiency $\eta$ of the ball screw feed mechanism is 0.88, a lead L of a ball screw is 10 mm, a transmission efficiency $\varepsilon$ in the outer gear portion 62 or 64 is 0.99, and a transmission efficiency $\nu$ of the cycloid decelerator 6 is 0.1 when a reduction ratio R of the cycloid decelerator 6 is set at 60, a counter torque acting on the input shaft I of the cycloid decelerator 6 during belt clamping can be found to be 0.075 Nm. In contrast, if in the clamp motor 8, a viscous friction torque T1 of an oil seal is 0.065 Nm and a friction torque T2 of a brush is 0.04 Nm, an input torque acting on the input shaft I on the basis of these friction torques can be found to be 0.105 Nm, which means that the torque larger than the counter torque is applied to the input shaft I. Thus, without any torque generated by the clamp motor 8, the position of the movable pulleys 32, 42 can be maintained, and also the belt clamping force can be held.

(Description of Functions and Effects)

As described above, according to the present embodiment, it is possible to properly generate a belt clamping force, and also to reduce belt friction unlike existing automatic transmissions that include a disc spring and the like, by disposing the electric motor for belt clamping (clamp motor 8) in addition to the electric motor for shifting (shift motor 7).

Further, since a counter torque transmitted from the variator 2 as a reaction force during belt clamping can be drastically reduced by the cycloid decelerator 6, power consumption required to ensure the belt clamping force can be reduced.

Specifically, the counter torque acting on the input shaft I of the cycloid decelerator 6 from the variator 2 on the basis of the reaction force during belt clamping can be made smaller than the friction torque in the clamp motor 8, and a necessary belt clamping force can be ensured without generating any torque by the clamp motor 8, in other words, with the supply of power to the clamp motor 8 stopped.

Further, the evacuation travel of the vehicle is enabled by ensuring the belt clamping force even if the clamp motor 8 breaks down.

Although the embodiment of the present invention has been described above, the above embodiment is merely an illustration of one application example of the present invention and not intended to limit the technical scope of the present invention to the specific configuration of the above embodiment. The present invention can be variously changed and modified within the scope of matters recited in claims.

This application claims a priority based on Japanese Patent Application No. 2016-200339 filed with the Japanese Patent Office on Oct. 11, 2016, the entire contents of which is incorporated herein by reference.

The invention claimed is:

1. An automatic transmission, comprising:
   a variator including a first pulley, a second pulley and a belt wound around the first pulley and the second pulley;
   a first motor configured to give a pulley thrust force for shifting the variator to the first pulley or the second pulley;
   a second motor configured to cause a belt clamping force to be generated in the variator; and
   a power transmission mechanism provided between the second motor and the variator, the power transmission mechanism being configured to be capable of transmitting an output torque of the second motor to the first pulley and the second pulley,
   wherein the power transmission mechanism includes a cycloid decelerator configured to decelerate an input torque from the second motor, and transmit the decelerated input torque to the variator.

2. The automatic transmission according to claim 1, wherein:
   the automatic transmission is provided on a power transmission path linking a drive source of a vehicle and a drive wheel;
   the first pulley is a primary pulley connected to an output shaft of the drive source; and
   the second pulley is a secondary pulley connected to a rotary shaft of the drive wheel.

3. An automatic transmission, comprising:
   a variator including a first pulley, a second pulley and a belt wound around the first pulley and the second pulley;
   a first motor configured to give a pulley thrust force for shifting the variator to the first pulley or the second pulley;
   a second motor configured to cause a belt clamping force to be generated in the variator; and
   a power transmission mechanism provided between the second motor and the variator, the power transmission mechanism being configured to be capable of transmitting an output torque of the second motor to the first pulley and the second pulley,
   wherein the power transmission mechanism includes a high reduction ratio gear configured to decelerate an input torque from the second motor, and transmit the decelerated input torque to the variator, and
   wherein a reduction ratio of the high reduction ratio gear is a reduction ratio at which a counter torque that acts on an input shaft of the high reduction ratio gear from the variator on the basis of a reaction force during belt clamping is smaller than a friction torque in the second motor.

4. The automatic transmission according to claim 3, wherein:
   the automatic transmission is provided on a power transmission path linking a drive source of a vehicle and a drive wheel;
   the first pulley is a primary pulley connected to an output shaft of the drive source; and
   the second pulley is a secondary pulley connected to a rotary shaft of the drive wheel.

5. A control method for ensuring a belt clamping force while a speed ratio is being held in an automatic transmission including a first motor for shifting and a second motor for belt clamping, the method comprising:
   interposing a power transmission mechanism between the second motor and a variator of the automatic transmission, the power transmission mechanism including a high reduction ratio gear, and being configure to be capable of transmitting an output torque from the second motor to the first pulley and the second pulley via the high reduction ratio gear; and
   during belt clamping for holding the speed ratio of the variator, stopping supply of power to the second motor, and making a counter torque that acts on an input shaft of the high reduction ratio gear from the variator smaller than a friction torque in the second motor through the high reduction ratio gear.

* * * * *